United States Patent
Kennedy (10) Patent No.: US 10,091,015 B2
(45) Date of Patent: Oct. 2, 2018

(54) 3D MAPPING OF INTERNET OF THINGS DEVICES

(71) Applicant: Microsoft Technology Licensing, LLC, Redmond, WA (US)

(72) Inventor: Kevin Alan Kennedy, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 172 days.

(21) Appl. No.: 14/572,301

(22) Filed: Dec. 16, 2014

(65) Prior Publication Data

US 2016/0173293 A1   Jun. 16, 2016

(51) Int. Cl.
*G06F 15/177*      (2006.01)
*H04L 12/28*       (2006.01)
(Continued)

(52) U.S. Cl.
CPC ...... *H04L 12/2814* (2013.01); *H04L 41/0806* (2013.01); *H04W 4/043* (2013.01); *H04W 4/70* (2018.02); *H04W 4/80* (2018.02)

(58) Field of Classification Search
CPC ........... H04L 12/2814; H04L 41/0806; H04W 4/043; H04W 4/005; H04W 4/008; H04W 4/70; H04W 4/80
(Continued)

(56) References Cited

U.S. PATENT DOCUMENTS 6,678,737 B1 *  1/2004  Bucher ............... H04L 12/2836
                                                    709/231
6,885,362 B2 *  4/2005  Suomela ................ G08C 17/02
                                                    340/12.51
(Continued)

FOREIGN PATENT DOCUMENTS

WO         2013033442 A1      3/2013

OTHER PUBLICATIONS

ISA European Patent Office, International Search Report and Written Opinion Issued in Application No. PCT/US2015/063560, dated Mar. 9, 2016, WIPO, 12 Pages.
(Continued)

*Primary Examiner* — Philip Chea
*Assistant Examiner* — Wing Ma
(74) *Attorney, Agent, or Firm* — Alleman Hall Creasman & Tuttle LLP (57) ABSTRACT

A method for mapping and controlling network-enabled appliances with a control device may comprise collecting spatial information in three dimensions as at least one sensor of the control device is moved within an environment, receiving registration signals from network-enabled appliances in the environment, and associating each network-enabled appliance with a respective 3D position in the environment based on the spatial information. The method may include generating a digital map of the environment from the spatial information and placing a representation of each network-enabled appliance on the digital map based on
(Continued)

the respective 3D position. The method may also include generating a spatially aware rule set that applies to one or more rooms within the environment. The method may also include detecting a trigger event, and in response to the trigger event, commanding the network-enabled appliances according to the spatially aware rule set.

19 Claims, 5 Drawing Sheets

(51) Int. Cl.
    *H04L 12/24*     (2006.01)
    *H04W 4/04*     (2009.01)
    *H04W 4/70*     (2018.01)
    *H04W 4/80*     (2018.01)

(58) Field of Classification Search
    USPC .......................................................... 709/222
    See application file for complete search history.

(56) References Cited

U.S. PATENT DOCUMENTS

| | | | |
|---|---|---|---|
| 6,950,791 B1* | 9/2005 | Bray | G06F 17/30241 345/420 |
| 7,136,709 B2* | 11/2006 | Arling | G05B 15/02 340/3.1 |
| 7,277,572 B2* | 10/2007 | MacInnes | G06F 17/5004 345/419 |
| 8,200,275 B1* | 6/2012 | Fujisaki | H04M 1/274516 455/456.1 |
| 8,510,039 B1 | 8/2013 | Troy et al. | |
| 8,538,486 B1* | 9/2013 | Fujisaki | H04M 1/274516 455/550.1 |
| 8,577,392 B1* | 11/2013 | Pai | H04L 67/18 455/404.2 |
| 8,587,583 B2 | 11/2013 | Newcombe et al. | |
| 9,268,460 B1* | 2/2016 | Xu | G06F 3/04815 |
| 2006/0019679 A1* | 1/2006 | Rappaport | H04W 64/00 455/456.5 |
| 2006/0168178 A1* | 7/2006 | Hwang | H04L 12/2803 709/223 |
| 2007/0197236 A1* | 8/2007 | Ahn | H04L 12/2809 455/466 |
| 2008/0045234 A1* | 2/2008 | Reed | H04W 64/006 455/456.1 |
| 2008/0238653 A1* | 10/2008 | Unger | G06Q 30/018 340/531 |
| 2011/0161076 A1* | 6/2011 | Davis | G06F 3/04842 704/231 |
| 2011/0244919 A1* | 10/2011 | Aller | G06K 9/00973 455/556.1 |
| 2011/0312278 A1* | 12/2011 | Matsushita | H04L 12/40013 455/66.1 |
| 2012/0019627 A1* | 1/2012 | Choi | A47L 9/009 348/50 |
| 2012/0019674 A1* | 1/2012 | Ohnishi | G08C 17/00 348/207.1 |
| 2012/0087212 A1* | 4/2012 | Vartanian | G01S 15/08 367/118 |
| 2012/0094598 A1* | 4/2012 | Tysowski | H04W 4/001 455/41.1 |
| 2012/0109384 A1* | 5/2012 | Stepanian | G06F 21/10 700/275 |
| 2012/0229508 A1 | 9/2012 | Wigdor et al. | |
| 2012/0274745 A1 | 11/2012 | Russell | |
| 2013/0052946 A1* | 2/2013 | Chatterjee | H04W 4/008 455/41.1 |
| 2013/0198056 A1* | 8/2013 | Aldrey | G06Q 30/018 705/38 |
| 2013/0237234 A1* | 9/2013 | Jiao | H04W 24/02 455/444 |
| 2013/0311610 A1* | 11/2013 | Kim | H04L 12/2818 709/217 |
| 2013/0342568 A1 | 12/2013 | Ambrus et al. | |
| 2014/0047487 A1* | 2/2014 | Guedalia | H04N 21/43615 725/80 |
| 2014/0113665 A1* | 4/2014 | Li | G01C 21/206 455/457 |
| 2014/0113674 A1* | 4/2014 | Joseph | H04W 4/021 455/519 |
| 2014/0125651 A1 | 5/2014 | Sharp et al. | |
| 2014/0129006 A1 | 5/2014 | Chen et al. | |
| 2014/0148196 A1* | 5/2014 | Bassan-Eskenazi | G01S 11/02 455/456.1 |
| 2014/0213290 A1* | 7/2014 | Yamada | G01S 5/14 455/456.1 |
| 2014/0226851 A1 | 8/2014 | Alberth, Jr. et al. | |
| 2014/0244017 A1* | 8/2014 | Freiwirth | B33Y 50/00 700/100 |
| 2014/0267234 A1* | 9/2014 | Hook | H04W 4/02 345/419 |
| 2015/0062284 A1* | 3/2015 | Rangan | H04N 7/15 348/14.08 |
| 2015/0110355 A1* | 4/2015 | Dill | A63J 1/02 382/103 |
| 2015/0120000 A1* | 4/2015 | Coffey | H04L 12/2803 700/13 |
| 2015/0121471 A1* | 4/2015 | Kunjukrishnan | H04W 12/08 726/4 |
| 2015/0268058 A1* | 9/2015 | Samarasekera | G06K 9/00637 701/409 |
| 2015/0276266 A1* | 10/2015 | Warren | H04W 4/005 700/300 |
| 2015/0347114 A1* | 12/2015 | Yoon | G06F 8/61 235/375 |
| 2015/0370615 A1* | 12/2015 | Pi-Sunyer | G05B 15/02 700/276 |
| 2015/0370621 A1* | 12/2015 | Karp | G05B 15/02 719/328 |
| 2015/0372834 A1* | 12/2015 | Karp | G05B 15/02 700/276 |
| 2016/0029224 A1* | 1/2016 | Edge | G01S 5/0252 455/456.1 |
| 2016/0066154 A1* | 3/2016 | Shin | G01S 5/0018 455/456.1 |
| 2016/0098468 A1* | 4/2016 | Logue | H04L 41/04 707/756 |
| 2016/0099826 A1* | 4/2016 | Logue | H04L 41/04 709/223 |
| 2016/0133230 A1* | 5/2016 | Daniels | G06T 19/006 345/633 |
| 2016/0140868 A1* | 5/2016 | Lovett | G09B 19/0053 434/118 |
| 2016/0148417 A1* | 5/2016 | Kim | G06T 19/006 345/419 |
| 2016/0239733 A1* | 8/2016 | Hertz | G06F 17/30887 |
| 2017/0048280 A1* | 2/2017 | Logue | H04W 4/008 |
| 2017/0215028 A1* | 7/2017 | Rhoads | H04W 4/70 |

OTHER PUBLICATIONS

Izadi, et al., "KinectFusion: Real-Time Dynamic 3D Surface Reconstruction and Interaction", In Proceedings of SIGGRAPH, Aug. 7, 2011, 10 pages.

Newcombe, et al., "KinectFusion: Real-Time Dense Surface Mapping and Tracking", In Proceedings of the 10th IEEE International Symposium on Mixed and Augmented Reality, Oct. 26, 2011, 10 pages.

"Nutiteq brings offline, indoor & 3D maps into iPhone and iPad", Published on: Jul. 2014 Available at: http://www.nutiteq.com/nutiteq-brings-offline-indoor-3d-maps-into-iphone-and-ipad/.

J. Hill, David., "Handheld 3D Scanner Lets You Digitize Objects and Rooms in Minutes", Published on: May 3, 2012 at: http://singularityhub.com/2012/05/03/handheld-3d-scanner-lets-you-digitize-objects-and-rooms-in-minutes/.

(56) References Cited

OTHER PUBLICATIONS

Wremann, et al., "Surface Reconstruction for 3D Robotic Mapping", Retrieved on: Sep. 16, 2014 Available at: http://ais.informatik.uni-freiburg.de/3dmapping_ws_iros08/abstracts/wiemann.pdf.
"Kinectfusion", Retrieved on: Sep. 25, 2014 Available at: https://www.youtube.com/watch?v=quGhaggn3cQ.
IPEA European Patent Office, International Preliminary Report on Patentability Issued in PCT Application No. PCT/US2015/063560, dated Jan. 16, 2017, WIPO, 9 Pages.
IPEA European Patent Office, Second Written Opinion Issued in PCT Application No. PCT/US2015/063560, Oct. 12, 2016, WIPO, 7 pages.

\* cited by examiner

3D MAPPING OF INTERNET OF THINGS DEVICES

BACKGROUND

The Internet of Things (IoT) is an emerging concept of computing devices embedded in objects, especially appliances, and connected through a network. Many of these objects are devices that are independently operable, but they may also be paired with a control system. Currently, the initial setup process to configure such an arrangement among multiple devices is laborious, especially for a home user. Various devices often operate under differing standards and have their own input methods, and individually incorporating such devices into an automation system is tedious and complicated. The tedium and complication involved with such a set up process poses significant barriers to widespread user adoption of IoT devices.

SUMMARY

Systems and methods for mapping and controlling network-enabled appliances with a control device are provided herein. One method may comprise collecting spatial information in three dimensions as at least one sensor of the control device is moved within an environment, receiving registration signals from network-enabled appliances in the environment, associating each network-enabled appliance with a respective three-dimensional (3D) position in the environment based on the spatial information, and registering each network-enabled appliance with the control device to create a registration log. The method may include generating a digital map of the environment from the spatial information and placing a representation of each network-enabled appliance on the digital map based on the respective 3D position.

In some implementations, the method may also include generating a spatially aware rule set that applies to one or more rooms within the environment based on the spatial information and registration log. The method may also include detecting a trigger event, and in response to the trigger event, commanding the network-enabled appliance according to the spatially aware rule set.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
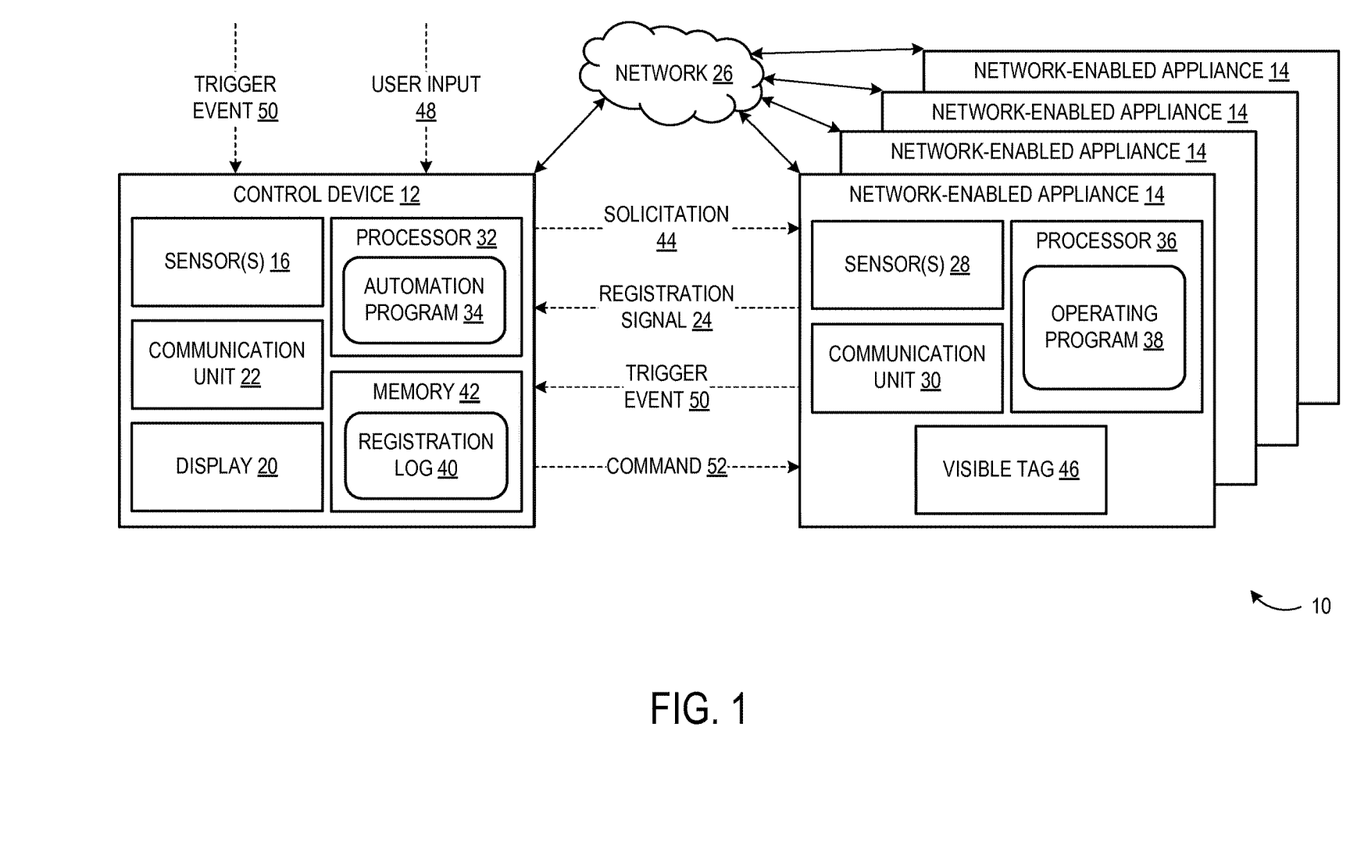
FIG. 1 is a simplified schematic diagram of an automation system.

FIG. 1 is a simplified schematic diagram of an automation system. The automation system 10 may comprise a control device 12 for mapping and controlling network-enabled appliances 14. The network-enabled appliances 14 may be so-called smart devices or Internet of Things (IoT) devices, which are physical objects such as appliances with computing devices embedded therein. Examples of network-enabled appliances 14 may include thermostats, smoke alarms, lights, home appliances, audio systems, televisions, security cameras, security sensors, and heating, ventilation, and air conditioning (HVAC) zones, among countless other examples. While the automation system 10 may be installed in a home, it may also be adapted to an office, a factory, a school, etc. The automation system 10 may also include multiple subsystems in different locations.

Figure 2:
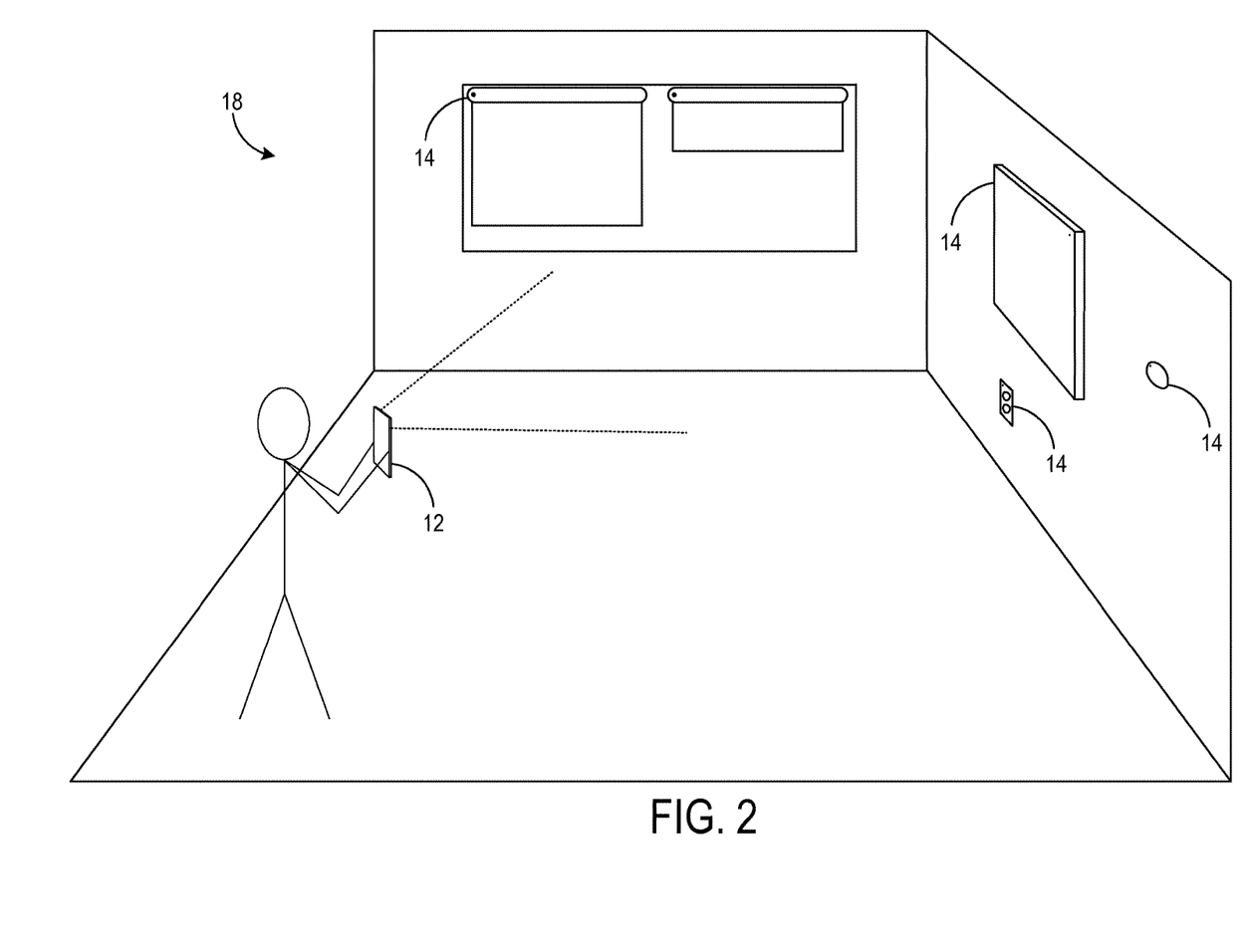
FIG. 2 is an example illustration of a user scanning an environment.

The control device 12 may comprise at least one sensor 16 configured to collect spatial information in three dimensions as the at least one sensor 16 is moved within an environment 18 (see FIG. 2). The sensors 16 may be integral to the control device 12, or they may be independently manipulable. The at least one sensor 16 may comprise at least one depth camera and/or color camera. By fixing on stationary objects in the environment 18 using such cameras, the control device may track and calculate movement of the sensor 16 relative to a stationary object, thereby acquiring data indicating the precise position of the sensors 16 or the control device 12 itself in three-dimensional (3D) space as well as roll, pitch, and yaw. Thus, the control device 12 may track movement with six degrees of freedom. The sensors 16 may also include an accelerometer, gyroscope, and/or magnetometer to augment such optical tracking. When combined with sensors 16 such as depth cameras and/or color cameras, the control device 12 may be able to accurately map the environment 18 as well as all of the network-enabled appliances in the environment 18.

The control device 12 may comprise a display 20 configured to display an output to a user. The control device 12 may comprise a communication unit 22 configured to receive a registration signal 24 from a network-enabled appliance 14 in the environment 18. The communication unit 22 may include some of the sensors 16 or may comprise its own sensors to receive communication combined with a transmitter to send communication. The communication unit 22 may be of a different type depending on what method the control device 12 uses to communicate with the network-enabled appliances 14, the user's preference, etc. The communication unit 22 may send and receive communication via network 26, which may be a personal, local, or wide network. Each network-enabled appliance 14 may also comprise at least one sensor 28 and a communication unit 30 for communicating with the control device 12, other network-enabled appliances 14, and the network 26.

The control device 12 may be a single dedicated device, but it may also be any number of computing devices that can connect to the network 26 locally or remotely. The control device 12 may comprise a processor 32 configured to execute an automation program 34, and the network-enabled appliance 14 may comprise a processor 36 configured to execute an operating program 38. Once executed, the automation program 34 may associate the network-enabled appliances 14 with a respective 3D position in the environment based on the spatial information and in some cases, the respective registration signal 24. The automation program 34 may be configured to register each network-enabled appliance 14 with the control device 12 to create a registration log 40 stored in memory 42. The registration log 40 may include the 3D position and other metadata, such as a name and device type, of each network-enabled appliance 14, which may be included in the registration signal 24 or discovered by other methods. The metadata may include an Internet Protocol (IP) address, media access control (MAC) address, or other proprietary identifier. The 3D position may be an absolute position such as coordinates in three dimensions, and it may also be a relative position with reference to architectural features of the environment 18 and/or positions of other network-enabled appliances 14.

The registration log 40 may already include "pre-loaded" device definitions for potential network-enabled appliances 14, and more definitions may be downloaded by the user from a server device through the network 26. The device definitions may also include instructions for communicating with the network-enabled appliance 14 so that one control device 12 may communicate with various network-enabled appliances 14 using the appropriate protocols.

The registration signals 24 may be any combination of various types of signals. For instance, one or more of the registration signals 24 may be infrared (IR) signals. The control device 12 may sense an IR signal with one of the sensors 16 that is an IR sensor and use the cameras to pinpoint the location of the network-enabled appliance 14 that sent the IR signal. The network-enabled appliance 14 may continuously emit the IR signal, or else the communication unit 22 may be configured to, before the registration signals 24 are received, solicit the registration signals 24 from the network-enabled appliances 14 by sending solicitations 44 via near field communication, wireless Internet, and/or a personal area network (PAN), among other options. The solicitation 44 may instruct the network-enabled appliance 14 to emit the registration signal 24. In this manner, a variety of network-enabled appliances 14 operating under different protocols may added to the automation system 10, including legacy devices from older systems.

Alternatively to IR signals, one or more of the registration signals 24 may be visible light signals detectable by the cameras. For example, a visible light signal may be a light that blinks a code that can be interpreted by the control device 12 to derive an identification of the network-enabled appliance 14. As yet another alternative, the at least one sensor 16 may comprise an array microphone and one or more of the registration signals 24 may be audio signals. The audio signal may be a predetermined sound, or it could simply be the noises that the network-enabled appliance 14 produces during normal operation. The array microphone may send a vector to the automation program 34 to be used with the spatial information to pinpoint the network-enabled appliance 14.

As still yet another alternative, the automation program 34 may be configured to read visible tags 46 to determine identifications and recognize and locate the network-enabled appliances 14. The visible tag 46 may be a product label with the name, serial number, or other identification of the product printed thereon. The automation program 34 may, for example, include a text recognition algorithm to read the visible tag 46 from image data captured by one or more of the cameras. The automation program 34 may also be configured to recognize the network-enabled appliances 14 with machine vision techniques such as object recognition, using the image data from the cameras. Reading visible tags 46 or recognizing objects in this manner may provide backwards compatibility for legacy devices using old and/or proprietary protocols, as well as new devices developed after the control device 12 and automation program 34. For device identification methods such as receiving IR or visible light signals and reading visible tags, the control device 12 may use the "pre-loaded" or downloaded device definitions to compare sensed data to known data and more accurately identify various network-enabled appliances 14.

The automation program 34 may be configured to generate a spatially aware rule set that applies to one or more rooms within the environment 18 based upon the spatial information and the registration log 40 and store the rule set in the memory 42. A spatially aware rule set is one that includes rules that cause certain actions to be undertaken when one or more conditions are satisfied, at least one of the conditions being a spatial condition of the IoT devices to which the actions are applied. While user input 48 may be received to select or unselect various rules within the rule set, the rule set may also be automatically generated without first receiving any user command to create each rule. The user input 48 may be spoken, input via an input device such as a mouse, keyboard, or touchpad, or otherwise conveyed to the automation system 10. The rooms may be identified during the initial scan by the user speaking the name of the room currently being scanned, by the user manually selecting or typing the name in, or by object recognition comparing the scanned room to typical room arrangements, to provide a few examples.

The rule set may indicate a goal the user may wish the automation system 10 to accomplish, such as reducing wasteful energy use, or an action the user may wish the automation system 10 to enact in the future, such as turning on lights in the doorway when the user comes home. The rule set dictates the circumstances under which the automation program 34 commands the network-enabled appliances 14 included in the rule set by sending a command 52 to at least one of the network-enabled appliances 14. Thus, upon setup, the user need not manually program each individual network-enabled appliance 14 by, for instance, typing code or selecting myriad options from drop down boxes on a graphical user interface (GUI), and the automation system 10 is automatically readied for use.

Furthermore, the automation system 10 may generate the rule set based on the configuration of network-enabled appliances 14 detected and predetermined programming by the manufacturer without receiving any sort of input from the user. For example, the control device 12 may register a smoke detector in the environment 18. The automation program 34 may be configured to detect a trigger event 50. The trigger event 50 may be sensed by one of the network-enabled appliances 14 which then notifies the control device 12, or the source of the trigger event 50 may be other than the network-enabled appliances 14, such as the sensors 16 of the control device 12. In the case of the smoke detector, detection of the smoke from the fire by the smoke detector may be the trigger event 50. In response to the trigger event 50, the automation program 34 may be configured to command the network-enabled appliances 14 within the room or rooms via the communication unit 22 according to the spatially aware rule set. The control device 12 may automatically generate a spatially aware rule set to direct occupants to the nearest safe exit by commanding lights to turn on and an audio system to announce directions over speakers when a fire occurs.

FIG. 2 is an example illustration of a user scanning an environment with the control device. In this example, the control device 12 is a tablet with integrated sensors 16. However, the control device 12 may take the form of a variety of computing devices including a smartphone, laptop computer, desktop computer, handheld device, or wearable device such as a head-mounted display (HMD), watch, or armband. As the user scans the room, the control device 12 may gather the spatial information and register the network-enabled appliances 14 in the room. The network-enabled appliances 14 shown in this example are smart blinds, a smart television, a thermostat, and an outlet.

Figure 3:
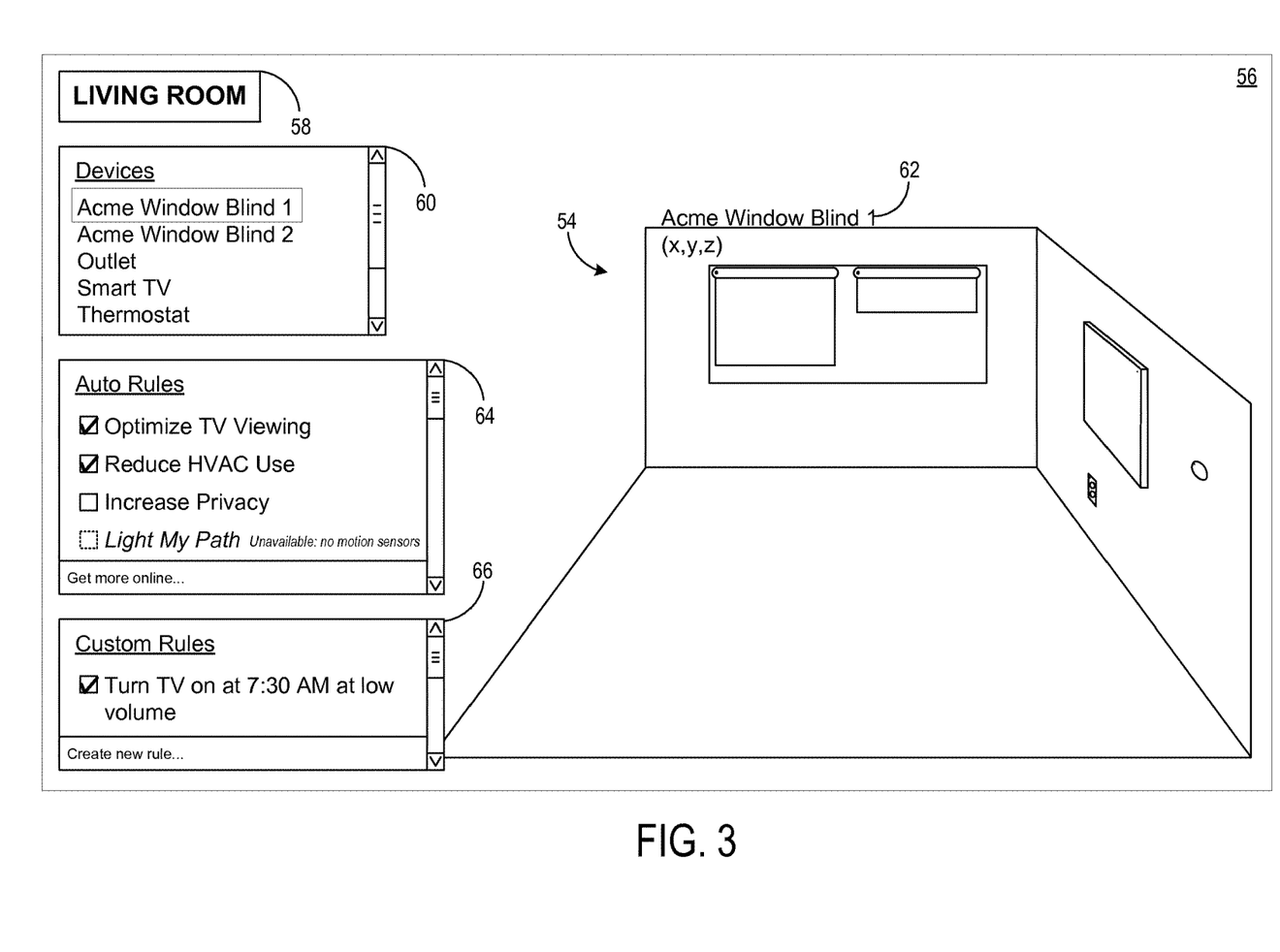
FIG. 3 is an example of a graphical user interface of the automation system of FIG. 1 for the environment of FIG. 2.

FIG. 3 is an example of a graphical user interface (GUI) of the automation system of FIG. 1 for the environment of FIG. 2. The automation program 34 may be configured to generate a digital map 54 of the environment 18 with the spatial information and place a representation of each network-enabled appliance 14 on the digital map 54 based on the respective 3D position. The map 54 may be a computer graphics simulation, stitched image data captured by the cameras of the control device 12, or a simplified two-dimensional floor plan made by projecting the 3D spatial information, for example. The GUI 56 containing the map 54 may be displayed on the on the display 20 of the control device 12. The room label 58 indicates that the GUI 56 in this example shows the living room. The GUI 56 shown includes graphical representations of the smart blinds, smart television, thermostat, and outlet on the map 54. The representations may be highlighted, brightened, outlined, or otherwise emphasized for ease of recognition. Further, when the user selects the name of one of the network-enabled appliances 14 in the device list 60, the name or other information about the selected network-enabled appliance 14 may be displayed as a label 62 on the map 54. The other information may be, for example, the metadata or the 3D position, shown here as "(x, y, z)." Alternatively, the label 62 may be displayed by default for each network-enabled appliance 14.

Generating the spatially aware rule set may comprise choosing from among a plurality of pre-programmed rules stored in memory 42, based on the configuration of network-enabled appliances 14 detected. The automation program 34 may be configured to compare conditions of the pre-programmed rules, such as types of network-enabled appliances 14 and threshold distances in spatial configurations of the network-enabled appliances 14 that support the rules, with the detected configuration of the network-enabled appliances 14 as determined by the spatial information and registration log 40. Once the spatially aware rule set has been generated, the user input 48 may comprise selecting at least one rule displayed on the GUI 56. For example, a rule list 64 shows the spatially aware rule set automatically generated for the living room and suggested to the user. The user may check or uncheck the individual rules of the rule set to choose which rules to include in the rule set and the rules may be checked or unchecked by default. Selecting a rule may also initiate a visual simulation of the selected rule in the GUI 56 so that the user may easily understand the function and involved network-enabled appliances 14 of the rule.

The rule named "Optimize TV Viewing" may be generated because the automation system 10 includes a television, blinds, and possibly lights as well that are located in the living room. This rule may reduce light in the living room when the television is on by dimming a ceiling light or lowering the blinds, for example. Further, as another particular example, based on the positions of windows and the position and model of the television, the automation program 34 may be configured to reduce glare on the TV screen at different times of day, seasons, and weather by altering the lights and moving the blinds. In the rule list 64, the rule named "Light My Path" is indicated as unavailable because the living room and/or hallway does not have motion sensors that are registered with the automation system 10. Unavailable rules may be hidden, but they may also be displayed to suggest ideas for future additions to the automation system 10 to the user.

Furthermore, the rule list 64 may include a GUI element labeled, for example, "Get more online . . . " Selecting this GUI element may direct the user to other rules available for download through the network 26. A custom rule list 66 may be included to allow the user to manually add custom rules as well. This may be done through drop down options, boxes for filling in criteria, typed code, etc. Custom rules may be added after selecting a GUI element labeled "Create new rule . . . ," as an example.

Other examples of rules may include closing the blinds facing the street outside to prevent offending neighbors based on knowing the content of a movie playing on the TV (e.g. an R rating), the position of the TV relative to the windows, and the position of the windows relative to the street outside. With a positionally aware light sensor or a security camera, positionally aware lighting, and positionally aware blinds, the user may set a desired luminance for a room and the automation system 10 may alter the environment 18 to maintain the luminance, e.g. by setting dimming on lights, opening and closing blinds, etc. Similarly to the smoke detector example described above, smoke detectors going off near a kitchen may trigger a rule to shut off all nearby appliances.

Figure 4:
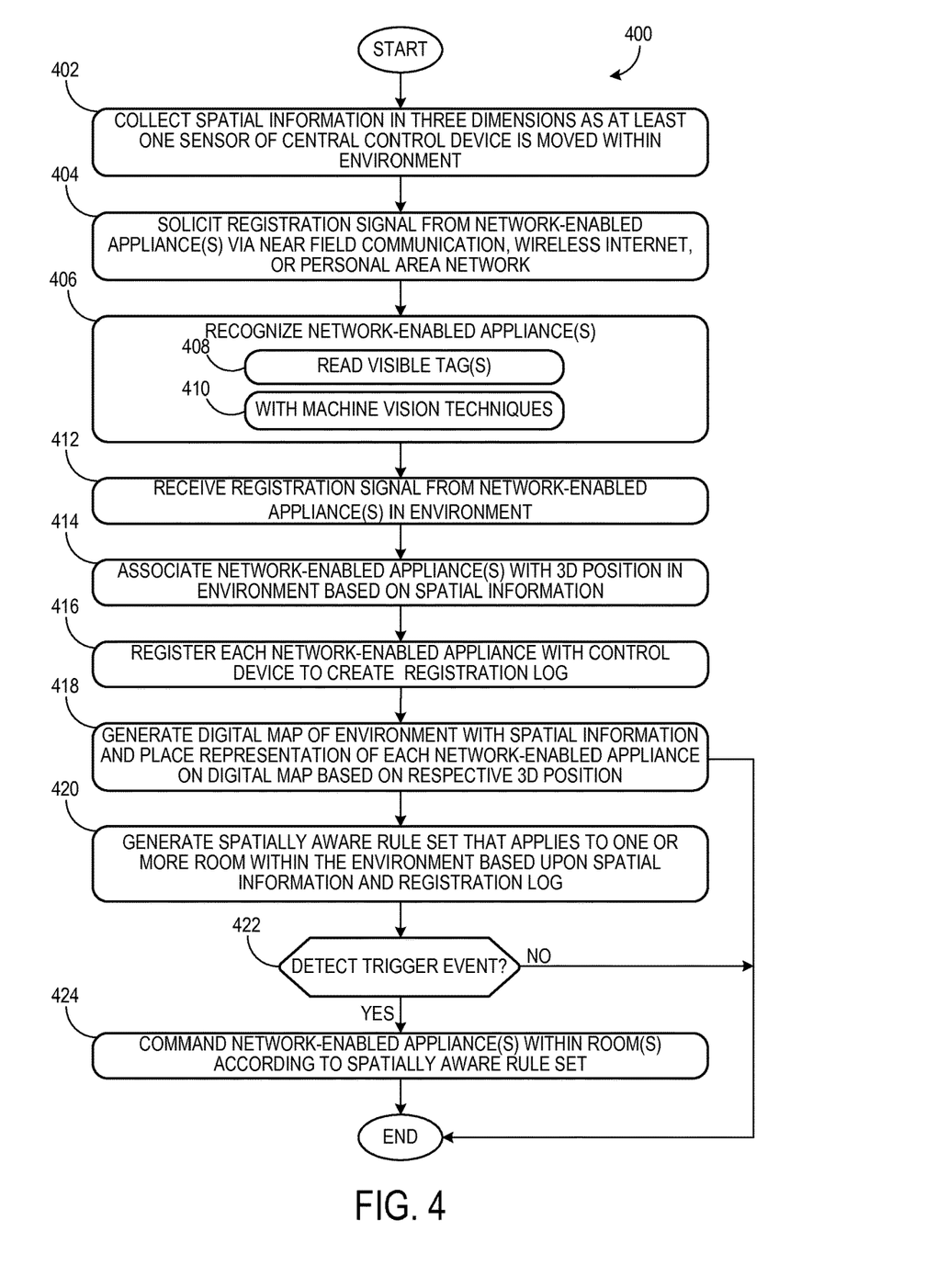
FIG. 4 is an example flowchart of a method for mapping and controlling network-enabled appliances with a control device.

FIG. 4 is an example flowchart of a method 440 for mapping and controlling network-enabled appliances with a control device. The following description of method 440 is provided with reference to the software and hardware components of automation system 10 described above and shown in FIG. 1. It will be appreciated that method 440 may also be performed in other contexts using other suitable hardware and software components.

With reference to FIG. 4, at 402 the method 440 may include collecting spatial information in three dimensions as at least one sensor of the control device is moved within an environment. The at least one sensor may comprise a depth camera and/or two color cameras. At 404, the method 440 may include, before registration signals are received, soliciting the registration signals from network-enabled appliances via near field communication, wireless Internet, or a personal area network. At 406, the method 440 may include recognizing the network-enabled appliance. As one example, at 408, the method 440 may include reading visible tags to recognize the network-enabled appliances. As another example, at 410, the method 440 may include recognizing the network-enabled appliances with machine vision techniques.

At 412, the method 440 may include receiving the registration signals from the network-enabled appliances in the environment. The registration signals may be any combination of infrared signals, visible light signals, or audio signals, for example. If the registration signals are audio signals, the at least one sensor may comprise an array microphone. At 414, the method 440 may include associating each network-enabled appliance with a respective 3D position in the environment based on the spatial information. At 416, the method 440 may include registering each network-enabled appliance with the control device to create a registration log. At 418, the method 440 may include generating a digital map of the environment from the spatial information and placing a representation of each network-enabled appliance on the digital map based on the respective 3D position.

At 420, the method 440 may include generating a spatially aware rule set that applies to one or more rooms within the environment based upon the spatial information and the registration log. At 422, the method 440 may include determining whether a trigger event is detected. If YES (detecting a trigger event), the method may proceed to 424. If NO, the method may end. At 424, the method 440 may include, in response to the trigger event, commanding the network-enabled appliances within the room or rooms according to the spatially aware rule set.

The above systems and methods may provide for quick and user-friendly setup of IoT devices in an environment. The two-in-one mapping and device registering by scanning the environment even only once may take much of the manual effort out of setting up a new automation system. Various protocols may be incorporated in the same automation system with different methods for recognizing the IoT devices more suitable for different devices, including legacy devices. In addition, the automatic generation of rule sets according to what type of devices are present at which locations removes the burden of manual programming of the new automation system from the user.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
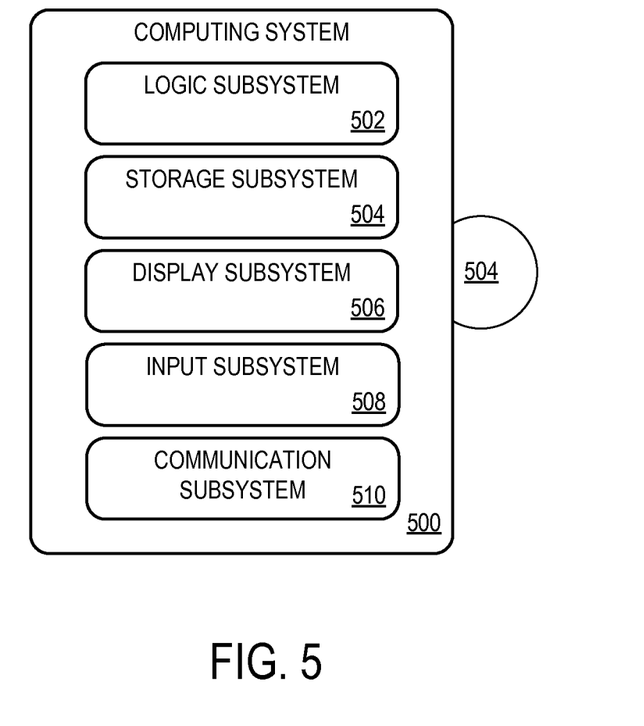
FIG. 5 is a simplified schematic diagram of a computing system.

FIG. 5 schematically shows a non-limiting embodiment of a computing system 500 that can enact one or more of the methods and processes described above. Computing system 500 is shown in simplified form. Examples of computing system 500 may include the control device 12 and portions of the network-enabled appliances 14 of FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 504 includes one or more physical devices configured to hold instructions executable by the logic subsystem to implement the methods and processes described herein. When such methods and processes are implemented, the state of storage subsystem 504 may be transformed—e.g., to hold different data.

Storage subsystem 504 may include removable and/or built-in devices. Storage subsystem 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 502 and storage subsystem 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic subsystem 502 executing instructions held by storage subsystem 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage subsystem 504. This visual representation may take the form of a graphical user interface (GUI). As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry.

Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

Claim Support Section

The subject matter of the present disclosure is further described in the following paragraphs. One aspect provides a method for mapping and controlling network-enabled appliances with a control device, the method comprising, collecting spatial information in three dimensions as at least one sensor of the control device is moved within an environment, receiving registration signals from network-enabled appliances in the environment, associating each network-enabled appliance with a respective three-dimensional (3D) position in the environment based on the spatial information, registering each network-enabled appliance with the control device to create a registration log, generating a digital map of the environment from the spatial information, and placing a representation of each network-enabled appliance on the digital map based on the respective 3D position. In this aspect, the method may additionally or alternatively include generating a spatially aware rule set that applies to one or more rooms within the environment based upon the spatial information and the registration log. The method may additionally or alternatively include detecting a trigger event, and in response to the trigger event, commanding the network-enabled appliances within the room or rooms according to the spatially aware rule set. The method may additionally or alternatively include wherein the at least one sensor comprises at least one depth and/or color camera. The method may additionally or alternatively include wherein the registration signals are infrared signals. The method may additionally or alternatively include wherein the registration signals are visible light signals. The method may additionally or alternatively include, before the registration signals are received, soliciting the registration signals from the network-enabled appliances via near field communication, wireless Internet, or a personal area network. The method may additionally or alternatively include recognizing the network-enabled appliances with machine vision techniques. The method may additionally or alternatively include wherein the at least one sensor comprises an array microphone and the registration signals are audio signals. The method may additionally or alternatively include reading visible tags to recognize network-enabled appliances.

Another aspect provides an automation system comprising a control device for mapping and controlling network-enabled appliances, the control device comprising at least one sensor configured to collect spatial information in three dimensions as the at least one sensor is moved within an environment, a communication unit configured to receive registration signals from network-enabled appliances in the environment, and a processor configured to execute an automation program to associate each network-enabled appliance with a respective three-dimensional (3D) position in the environment based on the spatial information, register each network-enabled appliance with the control device to create a registration log, generate a digital map of the environment from the spatial information, and place a representation of each network-enabled appliance on the digital map based on the respective 3D position. The automation system may additionally or alternatively include wherein the automation program is further configured to generate a spatially aware rule set that applies to one or more rooms within the environment based upon the spatial information and the registration log. The automation system may additionally or alternatively include wherein the automation program is further configured to, in response to a trigger event, command the network-enabled appliances within the room or rooms via the communication unit according to the spatially aware rule set. The automation system may additionally or alternatively include wherein the at least one sensor comprises at least one depth camera and/or color camera. The automation system may additionally or alternatively include wherein the registration signals are infrared signals. The automation system may additionally or alternatively include wherein the registration signals are visible light signals. The automation system may additionally or alternatively include wherein the communication unit is configured to, before the registration signals are received, solicit the registration signals from the network-enabled appliances via near field communication, wireless Internet, or a personal area network. The automation system may additionally or alternatively include wherein the at least one sensor comprises an array microphone and the registration signals are audio signals. The automation system may additionally or alternatively include wherein the automation program is configured to read visible tags to recognize the network-enabled appliances.

Another aspect provides an automation system comprising a control device for mapping and controlling network-enabled appliances, the control device comprising at least one sensor configured to collect spatial information in three dimensions as the at least one sensor is moved within an environment, a communication unit configured to receive registration signals from network-enabled appliances in the environment, and a processor configured to execute an automation program to associate each network-enabled appliance with a respective three-dimensional (3D) position in the environment based on the spatial information, register each network-enabled appliance with the control device to create a registration log, generate a digital map of the environment from the spatial information, place a representation of each network-enabled appliance on the digital map based on the respective 3D position, generate a spatially aware rule set that applies to one or more rooms within the environment based upon the spatial information and the registration log, detect a trigger event, and in response to the trigger event, command the network-enabled appliances within the room or rooms via the communication unit according to the spatially aware rule set.

The invention claimed is:

1. A method for mapping and controlling network-enabled appliances with a control device, the method comprising:
    collecting, by at least one sensor of the control device, spatial information in three dimensions as the at least one sensor of the control device is moved within an environment containing network-enabled appliances, the at least one sensor including at least one camera;
    recognizing at least one of the network-enabled appliances within the environment with machine vision techniques including applying text recognition algorithms to read physical tags to identify and recognize network enabled appliances in image data captured by the at least one camera;
    receiving registration signals from at least one of the network-enabled appliances in the environment;
    associating each network-enabled appliance with a respective three-dimensional (3D) position in the environment based on the spatial information;
    registering each network-enabled appliance with the control device to create a registration log;
    generating a digital map of the environment from the spatial information;
    identifying rooms within the environment;
    placing a representation of each network-enabled appliance on the digital map based on the respective 3D position;
    generating a spatially aware rule set that applies to one or more of the rooms within the environment based upon the spatial information and the registration log;
    detecting a trigger event; and
    in response to the trigger event, commanding the network-enabled appliances within the room or rooms according to the spatially aware rule set.

2. The method of claim 1, wherein identifying the rooms comprises using object recognition to compare the spatial information to a typical room arrangement.

3. The method of claim 1,
    wherein identifying the rooms comprises receiving user input in the form of a spoken room name, a typed room name, or a manually selected room name, while collecting the spatial information.

4. The method of claim 1, wherein the at least one camera comprises at least one depth camera or color camera.

5. The method of claim 1, wherein the registration signals are infrared signals.

6. The method of claim 1, wherein the registration signals are visible light signals.

7. The method of claim 1, further comprising, before the registration signals are received, soliciting the registration signals from the network-enabled appliances via near field communication, wireless Internet, or a personal area network.

8. The method of claim 1, wherein the at least one sensor includes an additional sensor that comprises an array microphone and the registration signals include audio signals.

9. The method of claim 1, further comprising reading visible tags to recognize network-enabled appliances.

10. An automation system comprising a control device for mapping and controlling network-enabled appliances, the control device comprising:
    at least one sensor configured to collect spatial information in three dimensions as the at least one sensor is moved within an environment containing network-enabled appliances, wherein the at least one sensor includes at least one camera;
    a communication unit, including at least the one sensor or at least one second sensor, and further including a transmitter, the communication unit being configured to receive registration signals from at least one of the network-enabled appliances in the environment; and
    a processor configured to execute an automation program to:
        recognize at least one of the network-enabled appliances within the environment with machine vision techniques, the machine vision techniques including applying text recognition algorithms to read physical tags to identify and recognize network enabled appliances in image data captured by the at least one camera;
        associate each network-enabled appliance with a respective three-dimensional (3D) position in the environment based on the spatial information;
        register each network-enabled appliance with the control device to create a registration log;
        generate a digital map of the environment from the spatial information; identify rooms within the environment;
        place a representation of each network-enabled appliance on the digital map based on the respective 3D position;
        generate a spatially aware rule set that applies to one or more of the rooms within the environment based upon the spatial information and the registration log; and
        in response to a trigger event, command the network-enabled appliances within the room or rooms via the communication unit according to the spatially aware rule set.

11. The system of claim 10, wherein the automation program identifies the rooms by using object recognition to compare the spatial information to a typical room arrangement.

12. The system of claim 10, wherein the automation program identifies the rooms by receiving user input in the form of a spoken room name, a typed room name, or a manually selected room name, while the spatial information is collected.

13. The system of claim 10, wherein the at least one camera comprises at least one depth camera or color camera.

14. The system of claim 10, wherein the registration signals are infrared signals.

15. The system of claim 10, wherein the registration signals are visible light signals.

16. The system of claim 10, wherein the communication unit is configured to, before the registration signals are received, solicit the registration signals from the network-enabled appliances via near field communication, wireless Internet, or a personal area network.

17. The system of claim 10, wherein the at least one sensor includes an additional sensor that comprises an array microphone and the registration signals include audio signals.

18. The system of claim 10, wherein the automation program is configured to read visible tags to recognize the network-enabled appliances.

19. An automation system comprising a control device for mapping and controlling network-enabled appliances, the control device comprising:
- at least one sensor configured to collect spatial information in three dimensions as the at least one sensor is moved within an environment containing network-enabled appliances, wherein the at least one sensor includes at least one camera that captures image data;
- a communication unit, including at least the one sensor or at least one second sensor, and further including a transmitter, the communication unit being configured to receive registration signals from at least one of the network-enabled appliances in the environment; and
- a processor configured to execute an automation program to:
  - use the image data captured by the at least one camera and/or an additional camera of the control device to recognize at least one of the network-enabled appliances with machine vision techniques, the machine vision techniques including text recognition algorithms to read physical tags to identify and recognize network enabled appliances in the image data captured by the at least one camera;
  - associate each network-enabled appliance with a respective three-dimensional (3D) position in the environment based on the spatial information;
  - register each network-enabled appliance with the control device to create a registration log;
  - generate a digital map of the environment from the spatial information; identify rooms within the environment;
  - place a representation of each network-enabled appliance on the digital map based on the respective 3D position;
  - generate a spatially aware rule set that applies to one or more of the rooms within the environment based upon the spatial information and the registration log;
  - detect a trigger event; and
  - in response to the trigger event, command the network-enabled appliances within the room or rooms via the communication unit according to the spatially aware rule set.

* * * * *